US008517367B1

(12) United States Patent
Napier

(10) Patent No.: US 8,517,367 B1
(45) Date of Patent: Aug. 27, 2013

(54) METHODS AND SYSTEMS FOR INSTALLING SCREEN PROTECTORS FOR ELECTRONIC DEVICES

(75) Inventor: Keiko Napier, Glendale, CA (US)

(73) Assignee: Tru Protection, Inc., Glendale, CA (US)

( * ) Notice: Subject to any disclaimer, the term of this patent is extended or adjusted under 35 U.S.C. 154(b) by 0 days.

(21) Appl. No.: 13/561,556

(22) Filed: Jul. 30, 2012

(51) Int. Cl.
*B23Q 3/00* (2006.01)

(52) U.S. Cl.
USPC ................................ 269/289 R

(58) Field of Classification Search
USPC ............... 206/320, 564, 562, 223, 701, 563, 206/486, 15, 308.1, 313; 156/245, 248; 150/165; 455/575.8; 379/433.11; 269/289 R, 269/302.1; 40/638, 229.01
See application file for complete search history.

(56) References Cited

U.S. PATENT DOCUMENTS

| 4,977,475 | A * | 12/1990 | Shiba et al. | 360/133 |
| 7,634,081 | B2 * | 12/2009 | Wu | 379/433.11 |
| 7,775,352 | B2 * | 8/2010 | Alvarez et al. | 206/310 |
| 7,857,130 | B2 * | 12/2010 | Bartusiak | 206/411 |
| 2012/0087072 | A1 * | 4/2012 | McGuire et al. | 361/679.01 |
| 2012/0251274 | A1 * | 10/2012 | Frankel | 414/225.01 |

OTHER PUBLICATIONS

Salazar, "Screen Pro Clear Screen Protector Applicator Review", Mar. 2, 2012 <<http://geekbeat.tv/screen-pro-clear-screen-protector-applicator-review/>>.
Drummond, "Review: Kioky iPhone Screen Protector Applicator", Buy Me an iPhone.com, Jan. 13, 2011 <<http://www.buymeaniphone.com/2011/01/13/review-kioky-iphone-screen-protector-applicator/>>.
Richards, "Kioky, Perfect Fit Applicator/iPhone Screen Protector", Kickstarter, Feb. 6, 2011 <<http://kickstarter.com/projects/kioky/kioky-perfect-fit-applicator-iphone-screen-protect>>.

* cited by examiner

*Primary Examiner* — Luan K Bui
*Assistant Examiner* — Rafael Ortiz
(74) *Attorney, Agent, or Firm* — Greenberg Traurig, LLP

(57) ABSTRACT

In some embodiments, the instant invention is a kit having at least: a tray, having: a first cutout, a second cutout, and a third cutout; and a protective film for an electronic device, where a first alignment tab and a second alignment tab are attached to the protective film, where the at least one first alignment tab includes a first alignment portion that extends from an edge of the protective film, where the at least one second alignment tab includes a second alignment portion that extends from the edge of the protective film, where the first alignment portion of the first alignment tab matches a shape of the second cutout and where the second alignment portion of the second alignment tab matches a shape of the third cutout so that the first alignment tab and the second alignment tab are capable of aligning the protective film within the first cutout.

8 Claims, 20 Drawing Sheets

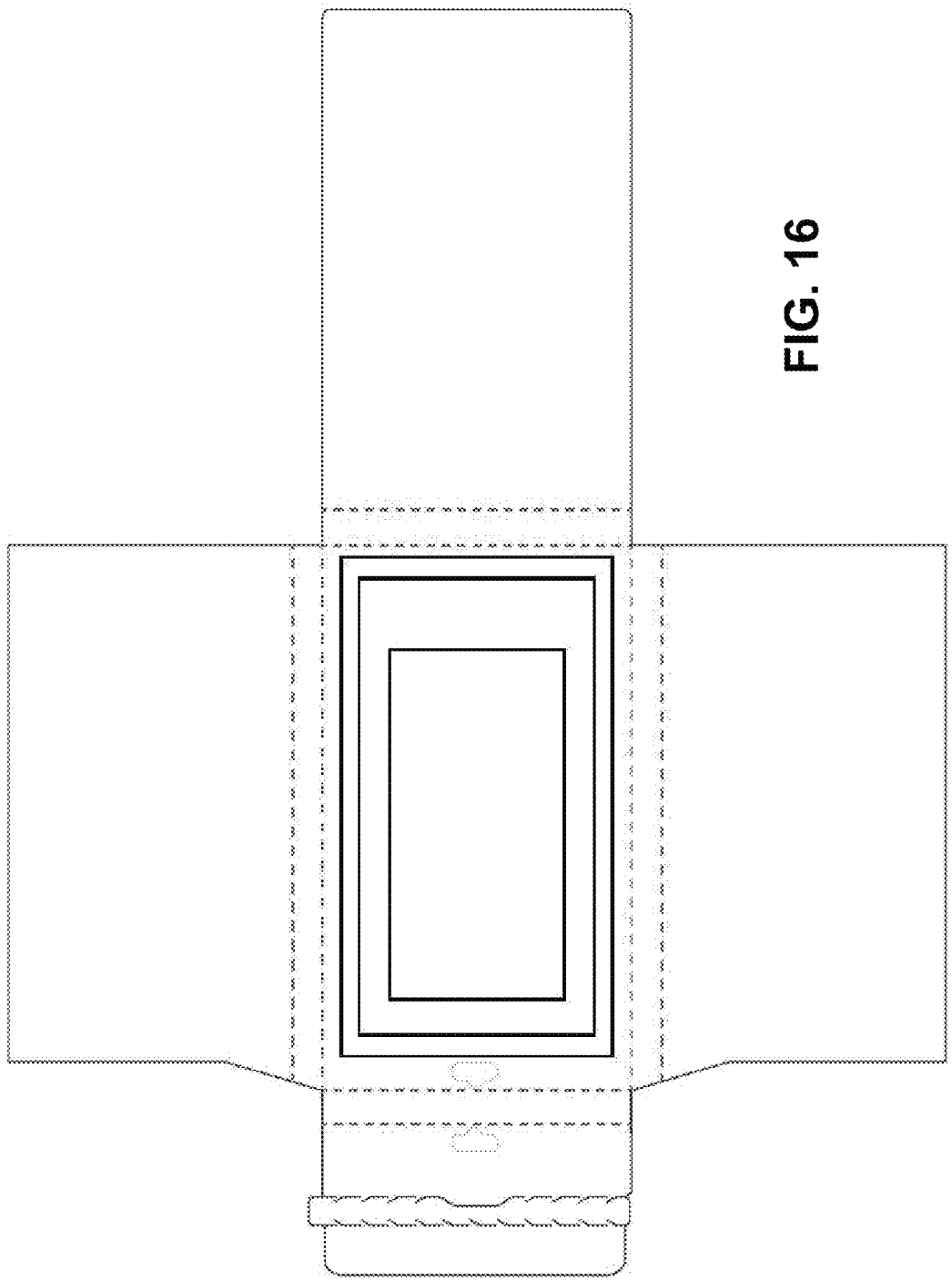

METHODS AND SYSTEMS FOR INSTALLING SCREEN PROTECTORS FOR ELECTRONIC DEVICES

TECHNICAL FIELD

In some embodiments, the instant invention relates to methods and systems for installing screen protectors for electronic devices.

BACKGROUND

Advances in many technology areas have resulted in a proliferation of electronic devices. Many of these devices are portable in nature. Cellular telephones, digital music (e.g., MP3) players, personal digital assistants, satellite radios, laptop computers and portable video/picture players, are examples of electronic devices in use today. Because these devices are used frequently, it is likely that they will be dropped, banged against other objects, and receive other types of abuse, whether deliberate or accidental. That is why, many of these devices have screens that can be scratched or damaged. Typically, each of these devices can be either sold together with or users can separately purchase a film that is designed to shield a screen of the electronic device from various negative factors such scratches, finger stamps, liquid spills, etc.

SUMMARY OF INVENTION

In some embodiments, the instant invention provides for a kit that includes at least the following components: a tray, where the tray has: i) a first cutout, where the first cutout extends from a top surface of the tray into a body of the tray, and where a first cavity of the first cutout has a first shape that matches a portion of an electronic device hereby enabling the portion of the electronic device to be capable of being at least partially placed within the first cavity such that a first surface of the portion of the electronic device faces a first bottom surface of the first cavity; ii) at least one second cutout, where the at least one second cutout extends from a first sidewall of the first cavity of the first cutout into the body of the tray and where the at least one second cutout has a second cavity that has a second shape; and iii) at lest one third cutout, where the at least one third cutout extends from a second sidewall of the first cavity of the first cutout into the body of the tray, and where the at least one third cutout has a third cavity that has a third shape; and a protective film for the electronic device, where the protective film has a fourth shape that is equal to a fifth shape of the first surface of the portion of the electronic device, where at least one first alignment tab and at least one second alignment tab are attached to a first film surface of the protective film, where the at least one first alignment tab comprises a first alignment portion that extends from an edge of the protective film, where the at least one second alignment tab comprises a second alignment portion that extends from the edge of the protective film, where the protective film has a second film surface that is capable of adhering to the first surface of the portion of the electronic device, where the first alignment portion of the at least one first alignment tab matches the second shape of the second cavity of the at least one second cutout and where the second alignment portion of the at least one second alignment tab matches the third shape of the at least one third cutout so that: the at least one first alignment tab and the at least one second alignment tab are capable of aligning the protective film within the first cavity of the first cutout when the protective film is placed within the first cavity of the first cutout, hereby resulting in the second film surface being aligned with the first surface of the portion of the electronic device that faces the second film surface.

In some embodiments, where the second film surface has a backing material, and where at least one backing tab is attached to the backing material, and where the at least one backing tab is utilized to remove the backing material, hereby resulting in the second film surface that is capable of adhering to the first surface of the portion of the electronic device.

In some embodiments, the at least one first alignment tab and the at least one second alignment tab are capable of disengaging from the protective film hereby resulting in the electronic device that the first surface of the portion of the electronic device to be protected with the protective film when the portion of the electronic device is removed from the first cavity of the first cutout.

In some embodiments, the first alignment portion of the at least one first alignment tab comprises a first adhesive portion, where the first adhesive portion of is capable of: i) adhering the first alignment portion of the at least one first alignment tab to a second bottom surface of the at least one second cutout and ii) disengaging the first alignment portion of the at least one first alignment tab from the second bottom surface of the at least one second cutout, where the second alignment portion of the at least one second alignment tab comprises a second adhesive portion, and where the second adhesive portion of is capable of i) adhering the second alignment portion of the at least one second alignment tab to a third bottom surface of the at least one third cutout, and ii) disengaging the second alignment portion of the at least one second alignment tab from the third bottom surface of the at least one third cutout.

In some embodiments, the first surface of the portion of the electronic device has at least one screen of the electronic device.

In some embodiments, the first sidewall of the first cavity and the second sidewall of the first cavity are the same sidewall.

In some embodiments, the first sidewall of the first cavity and the second sidewall of the first cavity are different.

In some embodiments, the first sidewall of the first cavity and the second sidewall of the first cavity are substantially opposite with respect to each other.

In some embodiments, the second surface of the portion of the electronic device has at least one screen of the electronic device.

In some embodiments, the tray is made out of at least one material selected from the group consisting of: paper-based, plastic-based, metal-based, and rubber-based material.

In some embodiments, the instant invention provides for a method of installing a protective film for an electronic device where the method can include at least the following steps: providing a tray, where the tray has: i) a first cutout, where the first cutout extends from a top surface of the tray into a body of the tray, and where a first cavity of the first cutout has a first shape that matches a portion of an electronic device hereby enabling the portion of the electronic device to be capable of being at least partially placed within the first cavity such that a first surface of the portion of the electronic device faces a first bottom surface of the first cavity; ii) at least one second cutout, where the at least one second cutout extends from a first sidewall of the first cavity of the first cutout into the body of the tray and where the at least one second cutout has a second cavity that has a second shape; and iii) at lest one third cutout, where the at least one third cutout extends from a second sidewall of the first cavity of the first cutout into the body of the tray, and where the at least one third cutout has a third cavity that has a third shape; and providing the protective film for the electronic device, where the protective film has a fourth shape that is equal to a fifth shape of the first surface of the portion of the electronic device, where at least one first alignment tab and at least one second alignment tab are attached to a first film surface of the protective film, where the at least one first alignment tab comprises a first alignment portion that extends from an edge of the protective film, where the at least one second alignment tab comprises a second alignment portion that extends from the edge of the protective film, where the protective film has a second film surface that is capable of adhering to the first surface of the portion of the electronic device, where the first alignment portion of the at least one first alignment tab matches the second shape of the second cavity of the at least one second cutout and where the second alignment portion of the at least one second alignment tab matches third shape of the at least one third cutout so that: the at least one first alignment tab and the at least one second alignment tab are capable of aligning the protective film within the first cavity of the first cutout when the protective film is placed within the first cavity of the first cutout, hereby resulting in the second film surface being aligned with the first surface of the portion of the electronic device that faces the second film surface.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

FIG. 16 illustrates yet certain features of some further embodiments of the present invention.

Figure 1A:
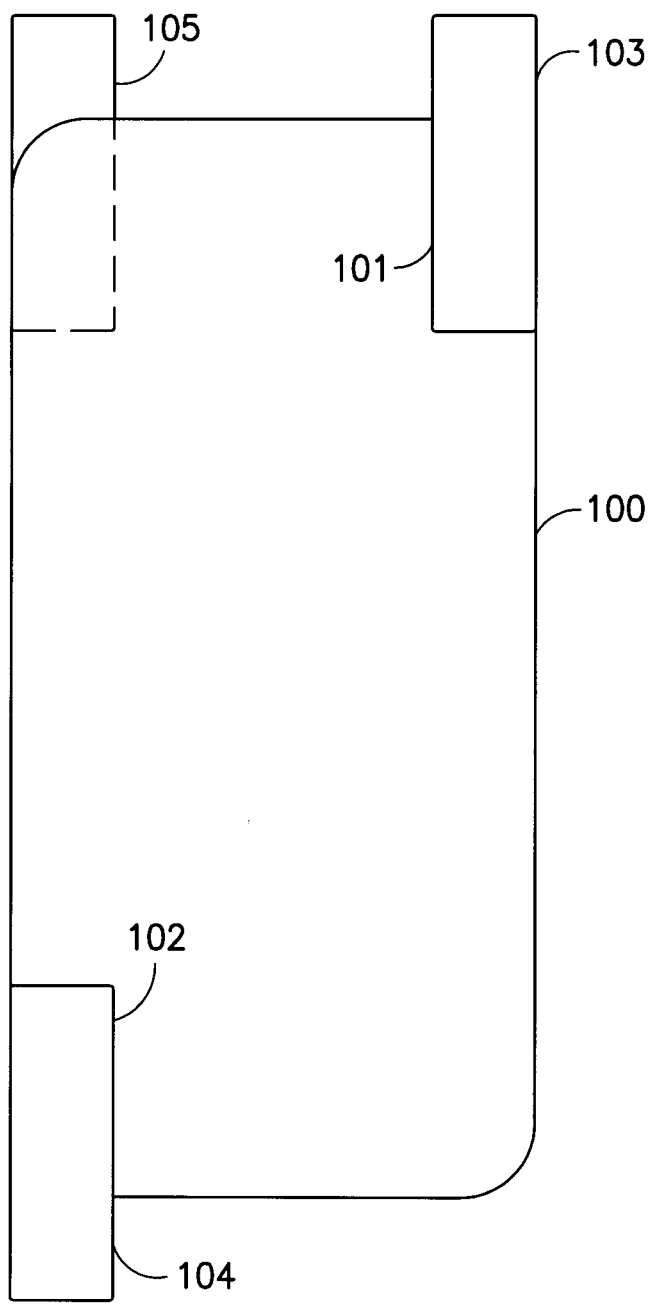
FIGS. 1A-1B illustrate certain features of some embodiments of the present invention.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In some embodiments, the instant invention can be utilized in a form of a kit that includes a tray. In some embodiments, the tray can be a stand-alone item or the tray can be a part of the kit's package. In some embodiments, the tray has a first cutout, where the first cutout extends from a top surface of the tray into a body of the tray and the first cutout is sufficiently sized so that a first shape of the first cutout matches a second shape of a first surface of a portion of an electronic device hereby allowing the portion of the electronic device, which has at least one screen, to be capable of at least partially fitting within a cavity of the first cutout such that the first surface of the portion of the electronic device faces a first bottom surface of the first cutout.

In some embodiments, the first shape of the first cutout matches the second shape of the first surface of the portion of the electronic device when there is only an insignificant tolerance (i.e., a space) between an internal surface of sidewalls of the first cutout and an outside surface of sidewalls of the portion of the electronic device that is fitted into a cavity of the first cutout. In some embodiments, the tolerance is less than 1 mm. In some embodiments, the tolerance is less than 0.5 mm. In some embodiments, the tolerance is less than 0.25 mm. In some embodiments, the tolerance is such that there is only insignificant free movement of the portion of the electronic device within the cavity of the first cutout.

In some embodiments, the tray has at least one second cutout. In some embodiments, the at least one second cutout extends from a sidewall of the first cutout into the body of the tray. In some embodiments, if the first cutout has generally a square shape or a rectangular shape, the at least one second cutout can extend from a sidewall of a side of the first cutout or a corner of two sides of the first cutout into the body of the tray. In some embodiments, if the first cutout has generally an oval shape, the at least one second cutout can extend from a portion of a wall along a circumference of the first cutout into the body of the tray.

In some embodiments, the shape of the at least one second cutout matches an alignment portion of a first alignment tab that is attached to a protective film that would be installed over the portion of the electronic device by utilizing the tray. In some embodiments, the alignment portion of the first alignment tab extends from the protective film and is fitted within a cavity of the at least one second cutout when the protective film is placed within the at least one first cutout.

In some embodiments, the shape of the second cutout matches the alignment portion of the first alignment tab when there is only an insignificant tolerance (i.e., the size of the space) between an internal surface of sidewalls of the second cutout and outside surface of sidewalls of the alignment portion of the first alignment tab that is fitted into the cavity of the second cutout. In some embodiments, the tolerance is less than 1 mm. In some embodiments, the tolerance is less than 0.5 mm. In some embodiments, the tolerance is less than 0.25 mm. In some embodiments, the tolerance is such that there is only insignificant free movement of the protective film within the cavity of the first cutout and is only insignificant free movement of the alignment portion of the first alignment tab within the cavity of the second cutout.

In some embodiments, there can be at least two second cutouts that extend from the same sidewall of the first cutout into the body of the tray. In some embodiments, there can be at least three second cutouts that extend from the same sidewall of the first cutout into the body of the tray. In some embodiments, there can be a plurality of the second cutouts that extend from the same sidewall of the first cutout into the body of the tray.

It is understood that each of the second cutouts has a corresponding alignment tab attached to the protective film such that the alignment portion of the alignment tab—i.e., the portion that extends from a side (border) of the protective film—matches a particular shape of its corresponding second cutout when it is fitted within a cavity of its corresponding second cutout. In some embodiments, each of the plurality of the second cutouts can have a shape that differs from shapes of others. In some embodiments, the shape of at least the alignment portion of a particular alignment tab can have a 3-D configuration that can have a substantial vertical component whose outside surface would match that internal vertical surface of sidewalls (of the cavity) of the second cutout. In some embodiments, the vertical component of the shape of the alignment portion of the alignment tab can have a height of over 1 mm. In some embodiments, the vertical component of the shape of the alignment portion of the alignment tab can have a height of over 2 mm. In some embodiments, the vertical component of the shape of the alignment portion of the alignment tab can have a height of over 5 mm. In some embodiments, the vertical component of the shape of the alignment portion of the alignment tab can have a height corresponding to a depth of the second cutout. In some embodiments, some but not all second cutouts can have the same shape.

In some embodiments, the tray can additionally have at least one third cutout. In some embodiments, the at least one third cutout can extend from a sidewall of the first cutout into the body of the tray. In some embodiments, the at least one third cutout can extend into the body of the tray from a portion of the sidewall of the first cutout such that the at least one third cutout is located in a generally opposite configuration to the location of the at least one second cutout. In some embodiments, there can be a plurality of the at least one second cutouts that extend from a first general location of the sidewall of the first cutout and there can be the plurality of the at least one third cutouts that extend from a second general location of the sidewall of the first cutout which is generally opposite to the first general location. In some embodiments, a number of the second cutouts corresponds to a number of the third cutouts. In some embodiments, a number of the second cutouts does not correspond to a number of the third cutouts. In some embodiments, there can be, for example, two second cutouts and three third cutouts. In some embodiments, each of third cutouts can have the same shape as other third cutouts or can have a different shape. In some embodiments, some but not all third cutouts can have the same shape.

It is understood that each of the third cutouts would have a corresponding alignment tab attached to the protective film such that the alignment portion of the alignment tab—i.e., the portion that extends from a side (border) of the protective film—matches a particular shape of its corresponding third cutout when it is fitted within a cavity of its corresponding third cutout. In some embodiments, the shape of at least the alignment portion of a particular alignment tab can have a 3-D configuration that can have a substantial vertical component whose outside surface would match that internal vertical surface of sidewalls (of the cavity) of the third cutout. In some embodiments, the vertical component of the shape of the alignment portion of the alignment tab can have a height of over 1 mm. In some embodiments, the vertical component of the shape of the alignment portion of the alignment tab can have a height of over 2 mm. In some embodiments, the vertical component of the shape of the alignment portion of the alignment tab can have a height of over 5 mm. In some embodiments, the vertical component of the shape of the alignment portion of the alignment tab can have a height corresponding to a depth of the third cutout. In some embodiments, some but not all third cutouts can have the same shape.

In some embodiments, the shapes of the alignment portions of the alignment tabs that correspond to the second and the third cutout can be the same or can be different. In some embodiments, the alignment tab(s) is/are directly attached the protective film. In some embodiments, the alignment tab(s) is/are attached the protective film through an intermediate (e.g., a suitable double-sided adhesive tape, etc.)

In some embodiments, in addition to the tray that is detailed above, the kit includes, but is not limited to, the protective film for the electronic device. In some embodiments, a shape of the protective film is equal to the second shape of the first surface of the portion of the electronic device that is capable of being fitted within the cavity of the first cutout. In some embodiments, prior to the being installed onto the electronic device, the protective film has a backing material attached to a first surface of the protective film which adheres to the portion of the electronic device upon the installation. In some embodiments, there is one or more backing tabs attached to the backing material to assist in removal of the backing material during the installation process.

In some embodiments, one or more of the alignment tabs, detailed above, are attached to a second surface of the protective film, which is opposite to the first surface of the protective film. In some embodiments, during the installation process, by matching of one or more of the alignment tabs to one or more of the second cutouts or to one or more of the second and one or more of the third cutouts, one or more of the alignment tabs are capable of aligning the protective film within the cavity of the first cutout such that one or more backing tab is accessible to be used for the removal of the backing material from the protective film. In some embodiments, after the portion of the electronic device is placed within the cavity of the first cutout in which the protective film has been placed and aligned, the protective film adheres to a surface of the portion of the electronic device that faces the protective film.

In some embodiments, after the electronic device with the attached protective film is taken out from the cavity of the first cutout, the alignment tabs, detailed above and below, are capable of disengaging from the protective film. In some embodiments, after the electronic device with the attached protective film is taken out from the cavity of the first cutout, the alignment tab(s), detailed above and below, is/are capable of disengaging from the protective film without compromising the adherence of the protective film to the electronic device. In some embodiments, the alignment tab(s) is/are capable of disengaging from the protective film without leaving aftereffect(s) of being previously attached to the protective film prior to and during the installation process.

In some embodiments, the alignment portion of the alignment tab(s) can exhibit an adhesive property that can allow the alignment portion to further secure the alignment portion of a particular alignment tab within a cavity of a corresponding second or third cutout. In some embodiments, the adhesive property of the alignment portion is based on one or more materials from which at least the alignment portion is made. In some embodiments, the adhesive property of the alignment portion is based on having an adhesive coating applied to a surface of the alignment portion that, for example, would contact a bottom side of the second or the third cutout.

In some embodiments, the tray can be made from any suitable material selected from the group of: paper-based, plastic-based, rubber-based, and metal-based materials.

In some embodiments, the alignment tab(s) can be made from any suitable material selected from the group of: paper-based, plastic-based, rubber-based, and metal-based materials.

Figure 1B:
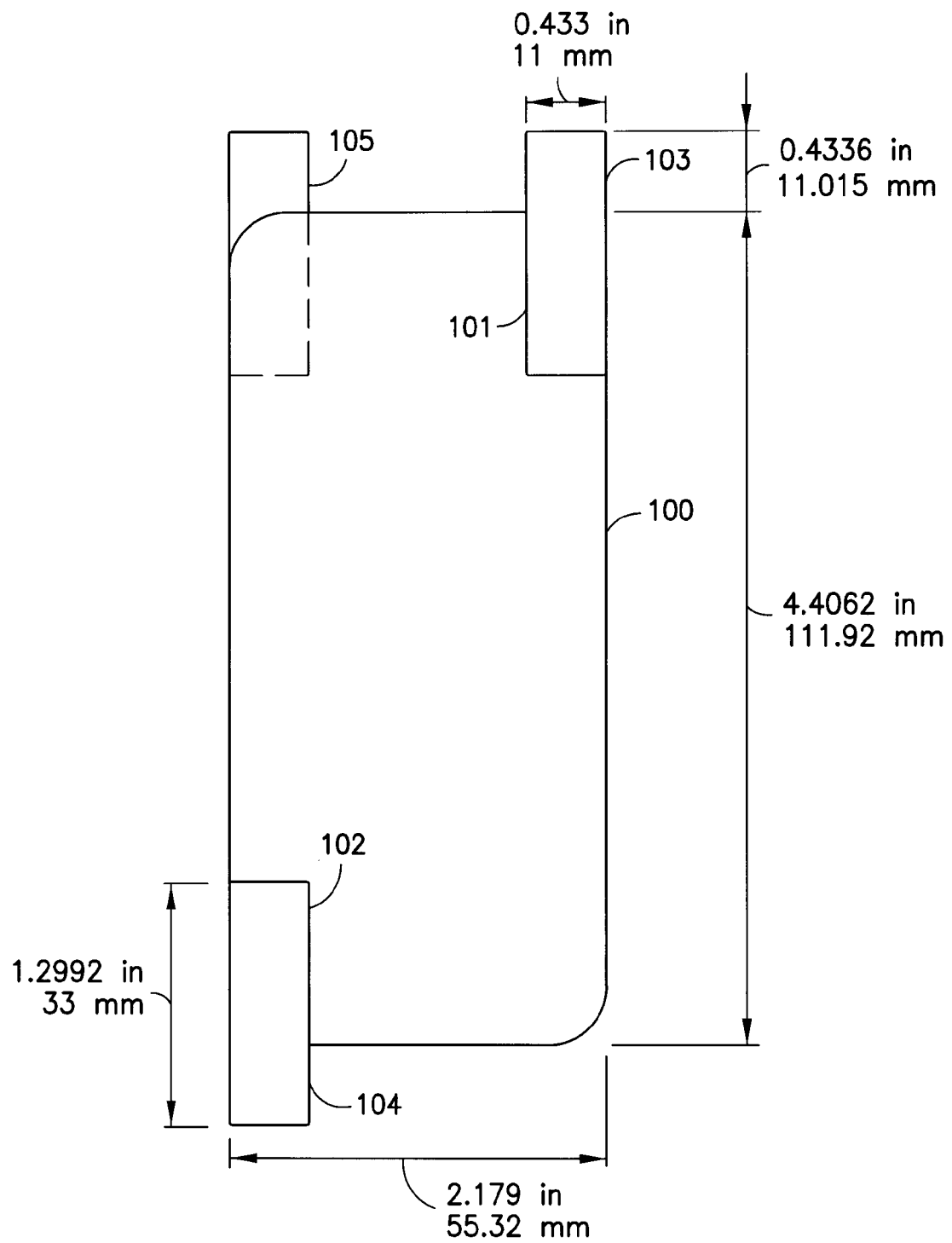

FIGS. 1A and 1B shows an exemplary protective film (100) in accordance with some embodiments of the instant invention. The protective film (100) has three tabs attached to it. There are two alignment tabs (101 and 102) which are attached to the same surface of the protective film (100). And, there is an backing tab (105) which is attached to a backing material covering the opposite surface of the protective film (100). The alignment tab (101) has an alignment portion (103) that extends from (i.e., outside of) the protective film (100). The alignment tab (102) has an alignment portion (104) that extends from (i.e., outside of) the protective film (100).

Figure 2:
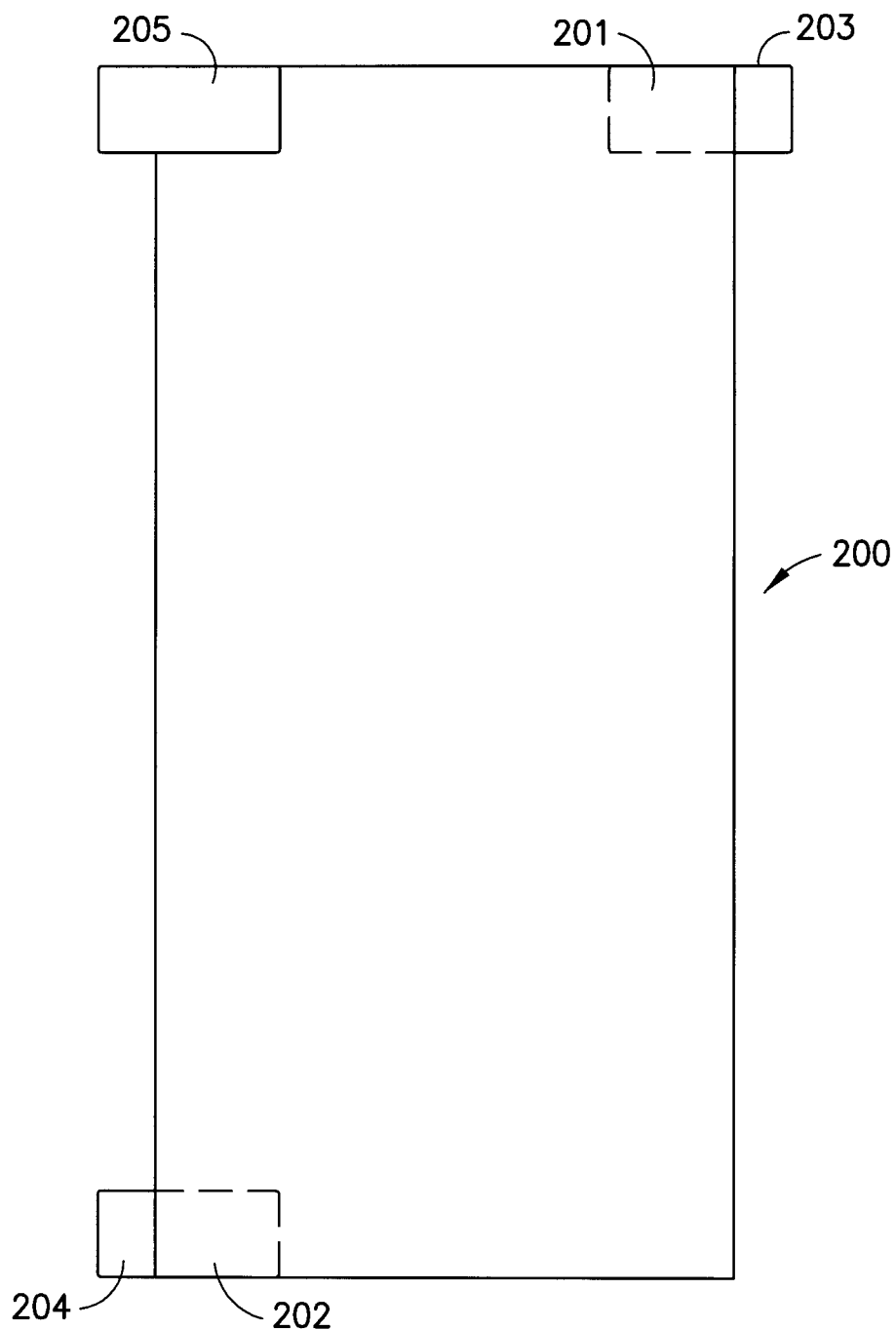
FIG. 2 illustrates certain features of some further embodiments of the present invention.

FIG. 2 shows an exemplary protective film (200) in accordance with some embodiments of the instant invention. The protective film (200) has three tabs attached to it. There are two alignment tabs (201 and 202) which are attached to the same surface of the protective film (200). And, there is an backing tab (205) which is attached to a backing material covering the opposite surface of the protective film (200). The alignment tab (201) has an alignment portion (203) that extends from (i.e., outside of) the protective film (200). The alignment tab (202) has an alignment portion (204) that extends from (i.e., outside of) the protective film (200).

Figure 3:
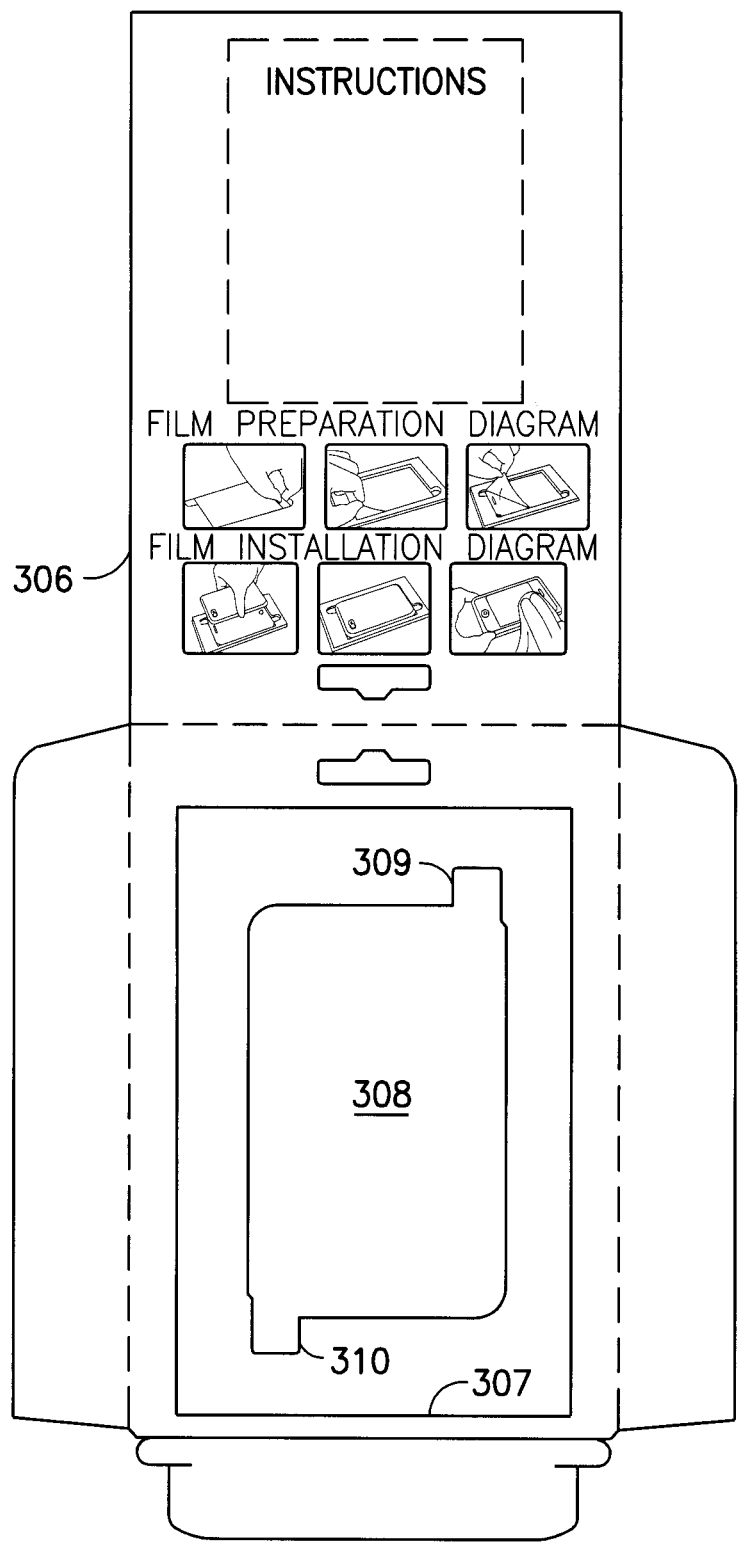
FIG. 3 illustrates certain features of some further embodiments of the present invention.

FIG. 3 shows an exemplary packaging (306) of an exemplary kit that includes an exemplary tray (307) designed in accordance with some embodiments of the instant invention. The tray (307) has three cutouts in the body of the tray. The first cutout (308) is a cutout into which: (1) a matching protective film (e.g., one of the protective films 100 and 200 of FIGS. 1 and 2) is placed and (2) a matching portion of an electronic device that is to be protected by the protective film is then also placed. A second cutout (309) and a third cutout (310) are cutouts in which matching alignment portions of corresponding alignment tabs attached to the matching protective film would reside. As FIG. 3 shows, the second cutout (309) and the third cutout (310) are positioned across from each other and extend from the opposite sides of the first cutout (308).

Figure 4:
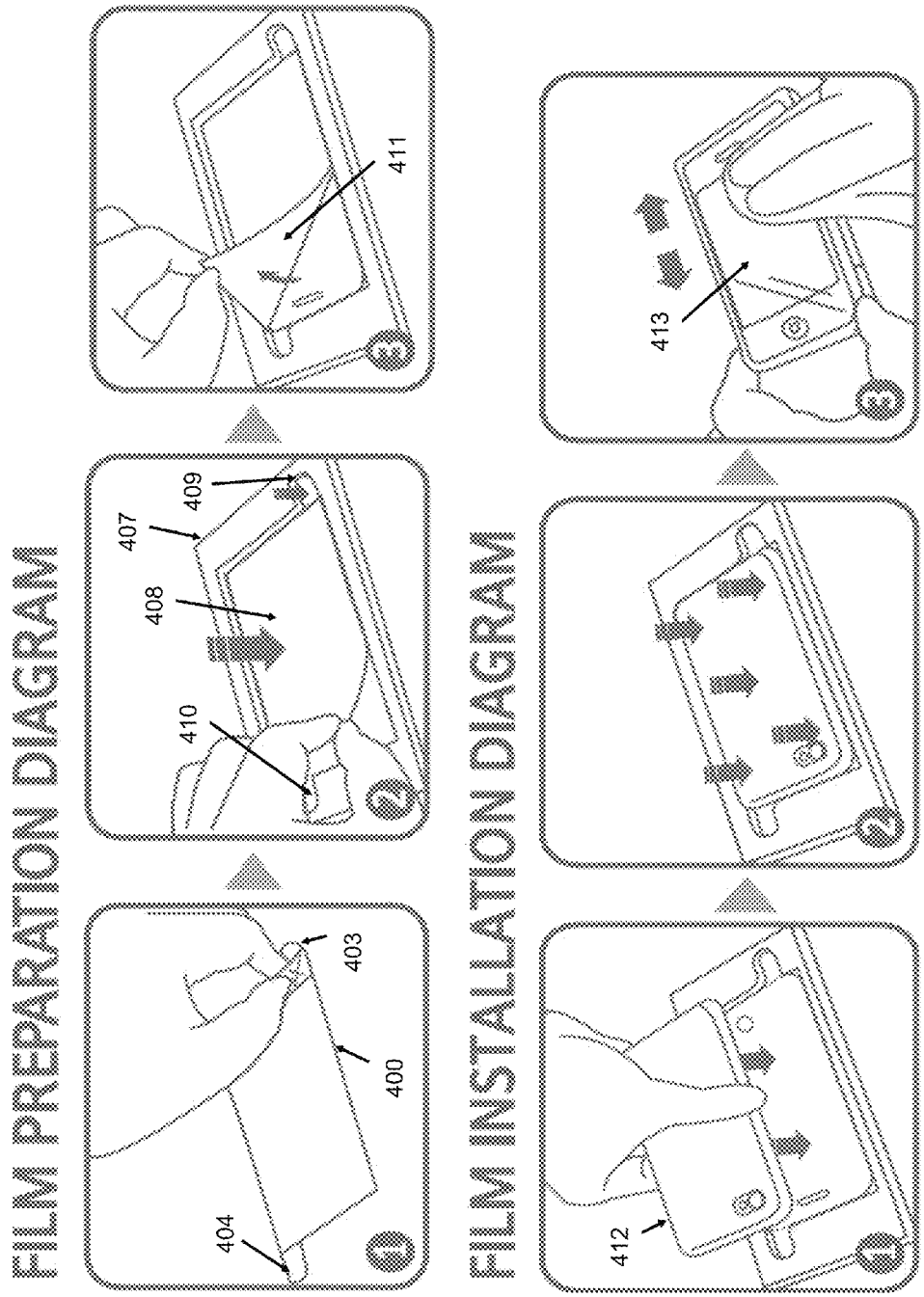
FIG. 4 illustrates certain features of some further embodiments of the present invention.

FIG. 4 shows schematic diagrams of exemplary processes performed in accordance with the principles of the instant invention. The exemplary "film preparation diagram" shows three illustrative steps that can be used for placing the protective film (400) into the first cutout (408) and the removal of the backing material (411) from the side by which the protective film (408) attaches to a surface of the electronic device (412) that has, for example, a screen. As the "film preparation diagram" shows, the protective film (400) is aligned within a cavity of the first cutout (408) by aligning the matching alignment portions (404 and 403) of the alignment tabs within cavities of the second and third cutouts (409 and 410.) As the exemplary "film preparation diagram" shows, the backing material (411) can be removed from the protective film (400) without the utilizing the backing tab(s).

The exemplary "film installation diagram" shows three illustrative steps that can be used for attaching the protective film (400) to a surface of the electronic device (412). In step 1, after the backing material (411) is removed during the exemplary "film preparation" stage, the matching portion of the electronic device (412) is placed into the cavity of the first cutout (408). In step 2, the matching protective film (400) is attached to the matching portion of the electronic device (412). In step 3, the electronic device (412) is removed from the first cutout of the tray (407) and the alignment tabs are disengaged from the protective film (400), resulting in the electronic device (412) with the protective film (400) attached to a surface of the electronic device (412) that has a screen (413).

Figure 5A:
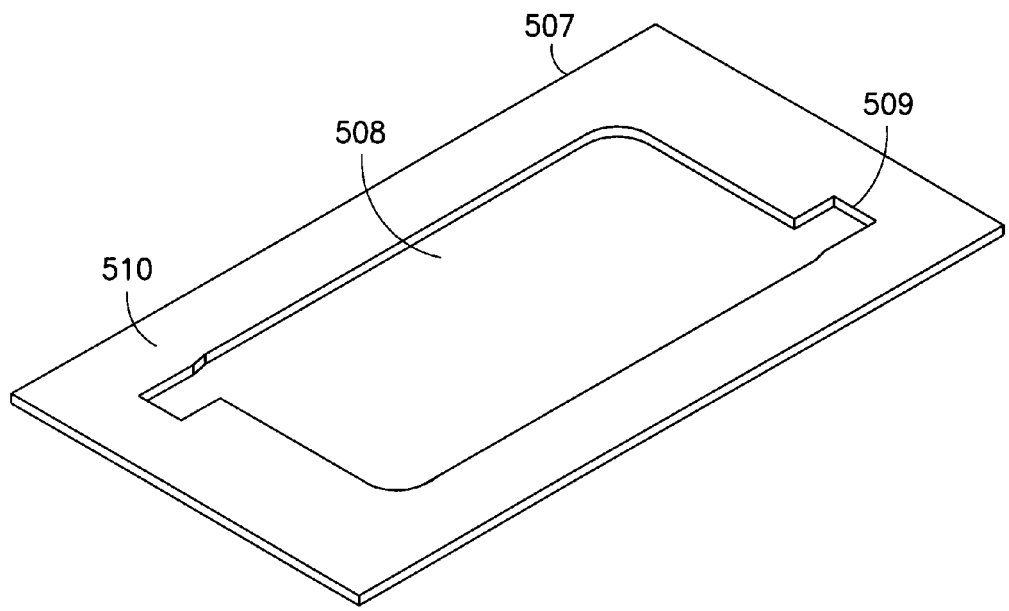
FIGS. 5A-5B illustrate certain features of some further embodiments of the present invention.
Figure 5B:
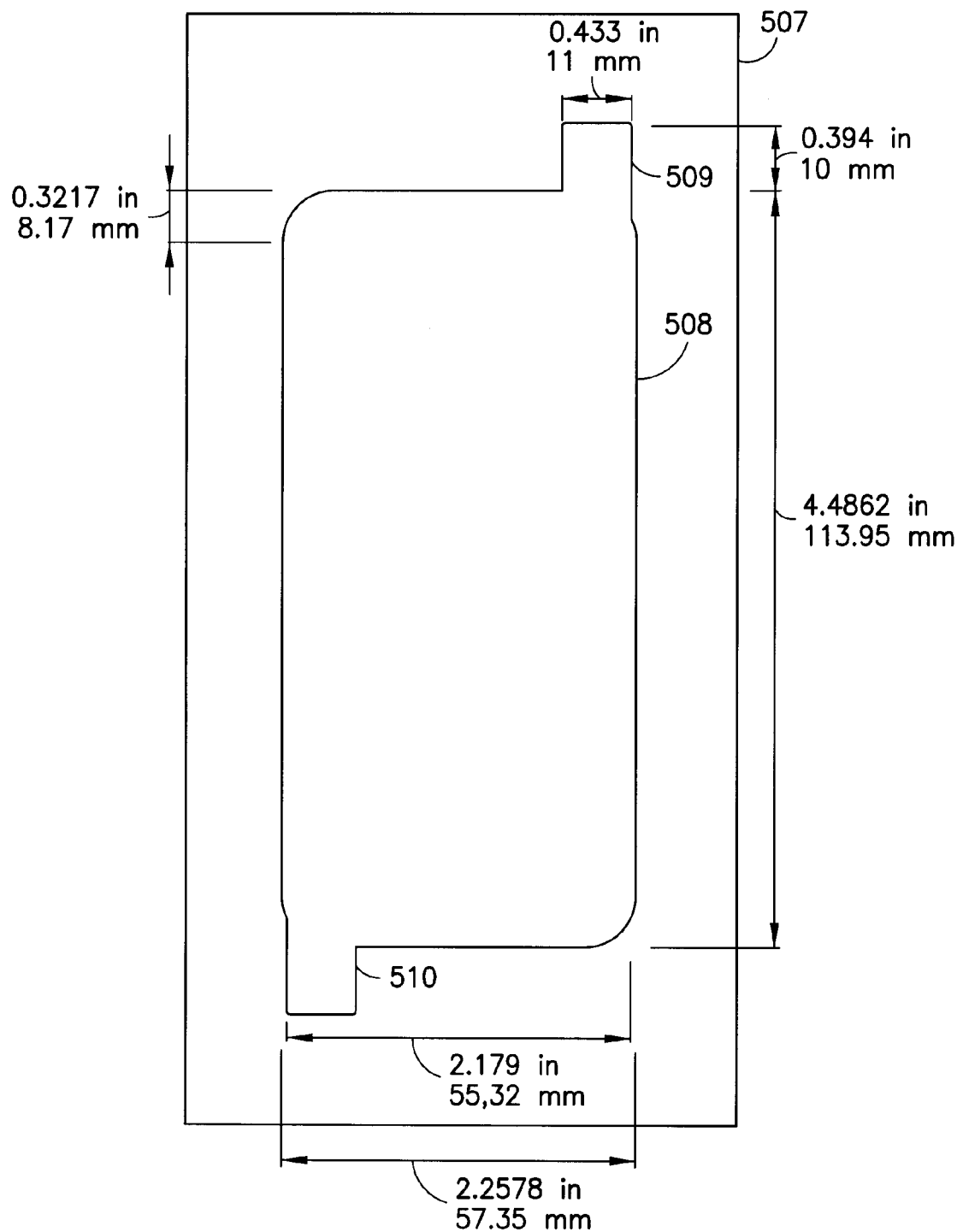

FIGS. 5A and 5B show an exemplary tray (507) designed in accordance with some embodiments of the instant invention. The tray (507) has three cutouts in the body of the tray. The first cutout (508) is a cutout into which: (1) a matching protective film is placed and (2) a matching portion of an electronic device that is to be protected by the matching protective film is then also placed. The second cutout (509) and the third cutout (510) are cutouts in which matching alignment portions of corresponding alignment tabs attached to the matching protective film would reside. As FIGS. 5A and 5B show, the second cutout (509) and the third cutout (510) are positioned across from each other and extend from opposite sidewalls of the first cutout (508).

Figure 6:
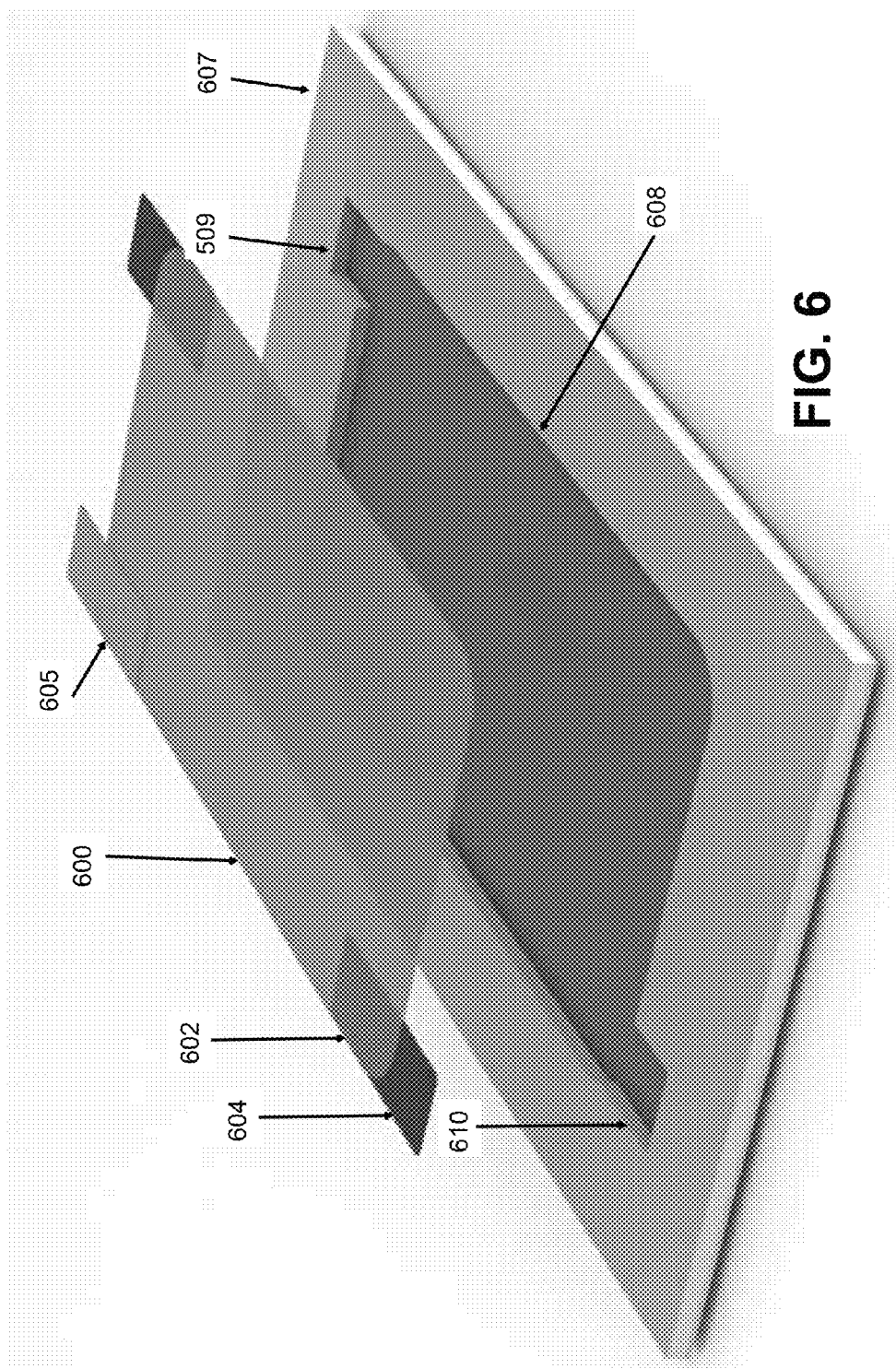
FIG. 6 illustrates certain features of some further embodiments of the present invention.
Figure 7:
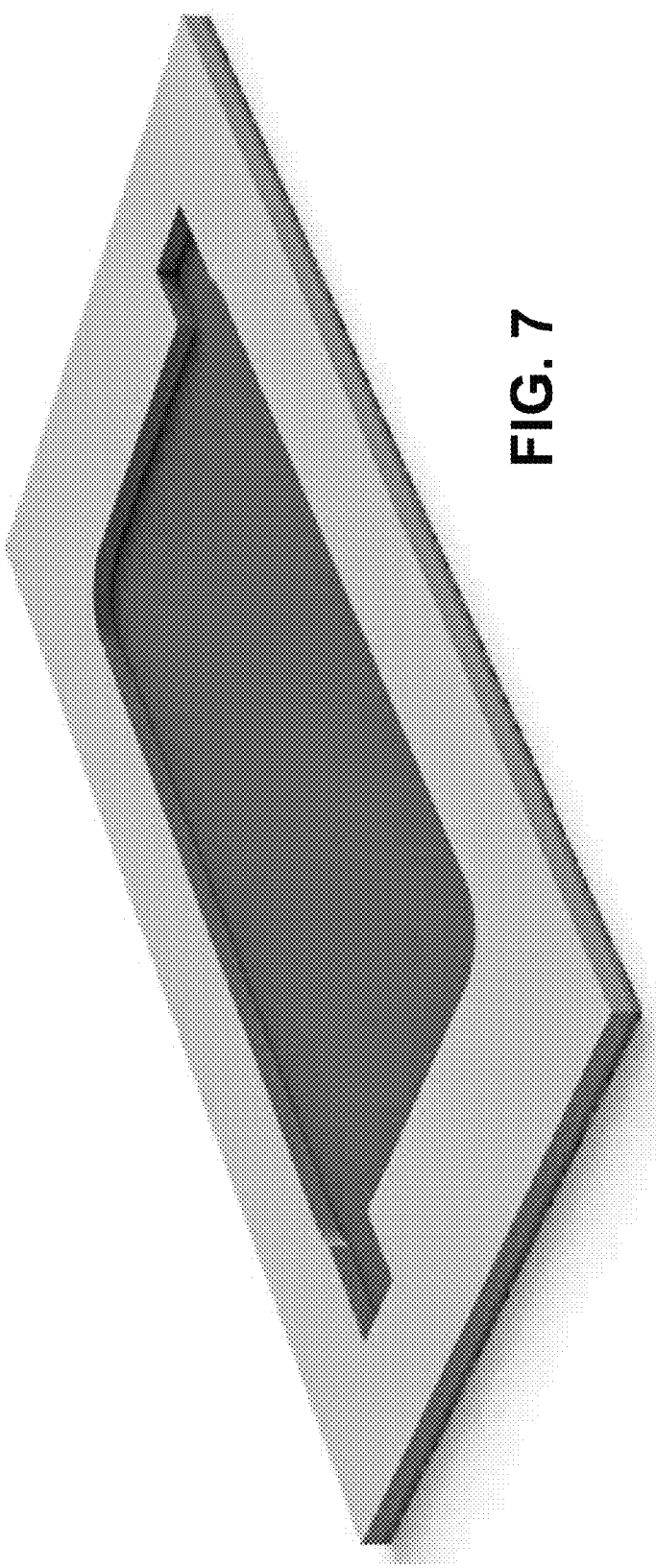
FIG. 7 illustrates certain features of some further embodiments of the present invention.
Figure 8:
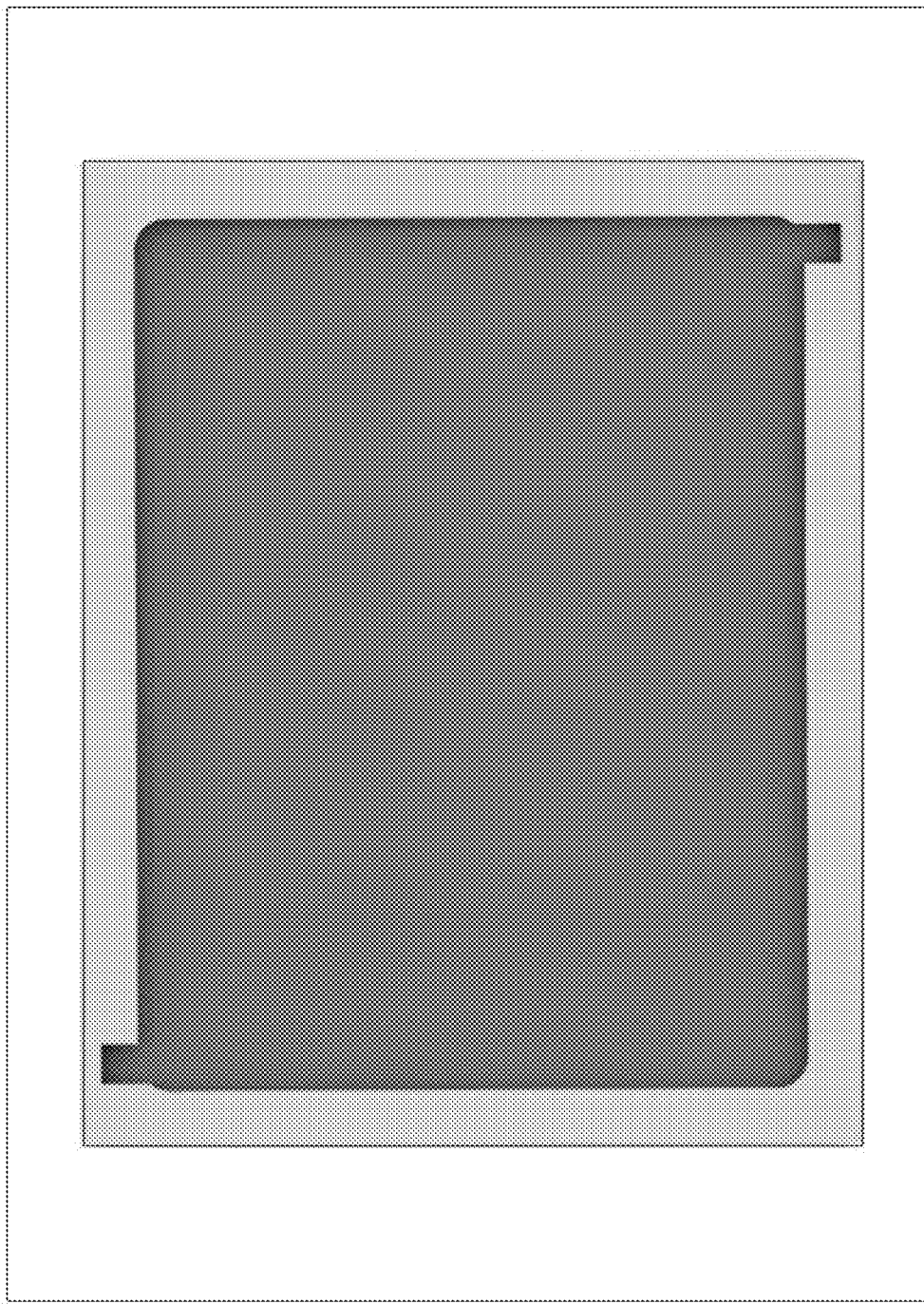
FIG. 8 illustrates yet certain features of some further embodiments of the present invention.
Figure 9:
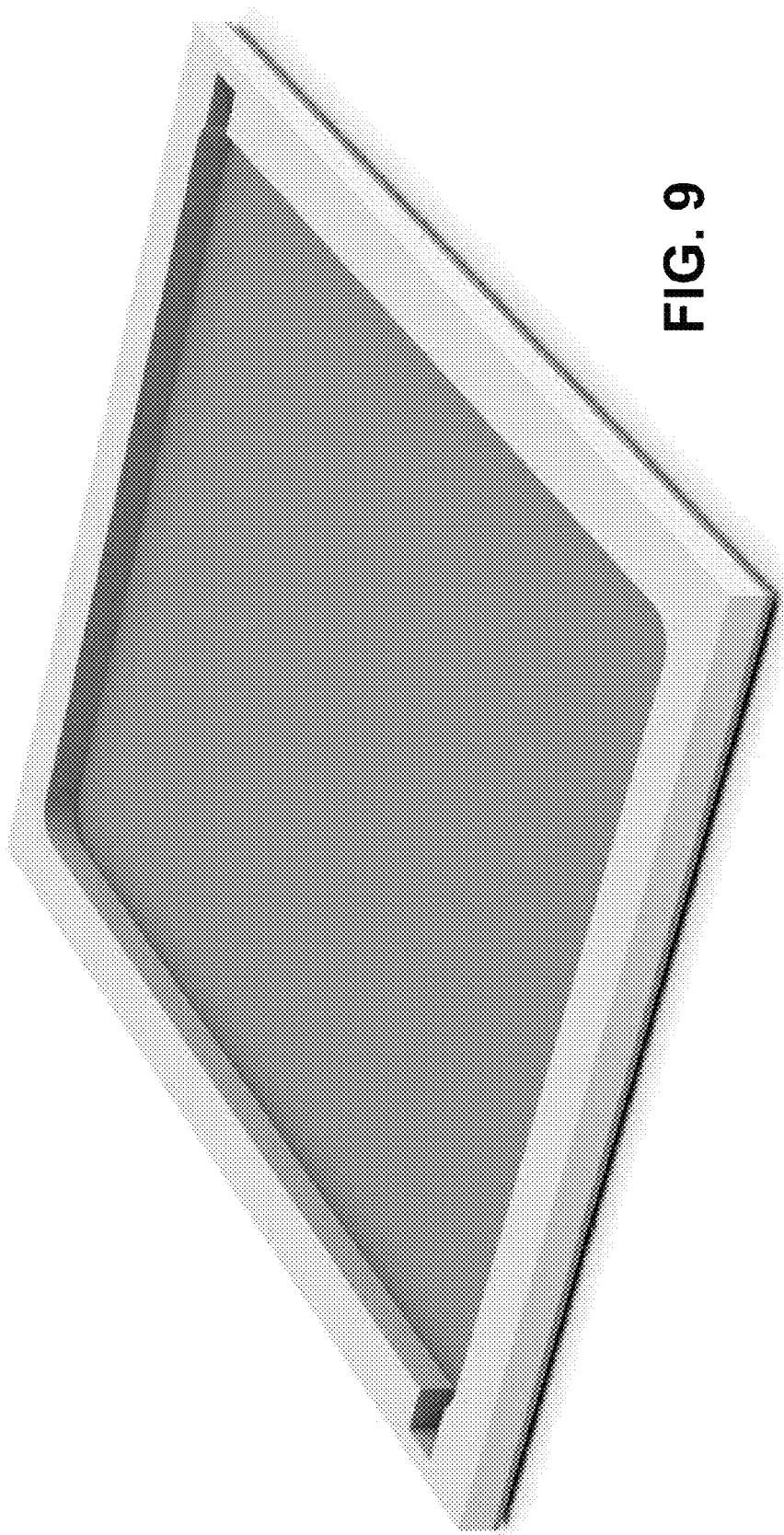
FIG. 9 illustrates yet certain features of some further embodiments of the present invention.
Figure 10:
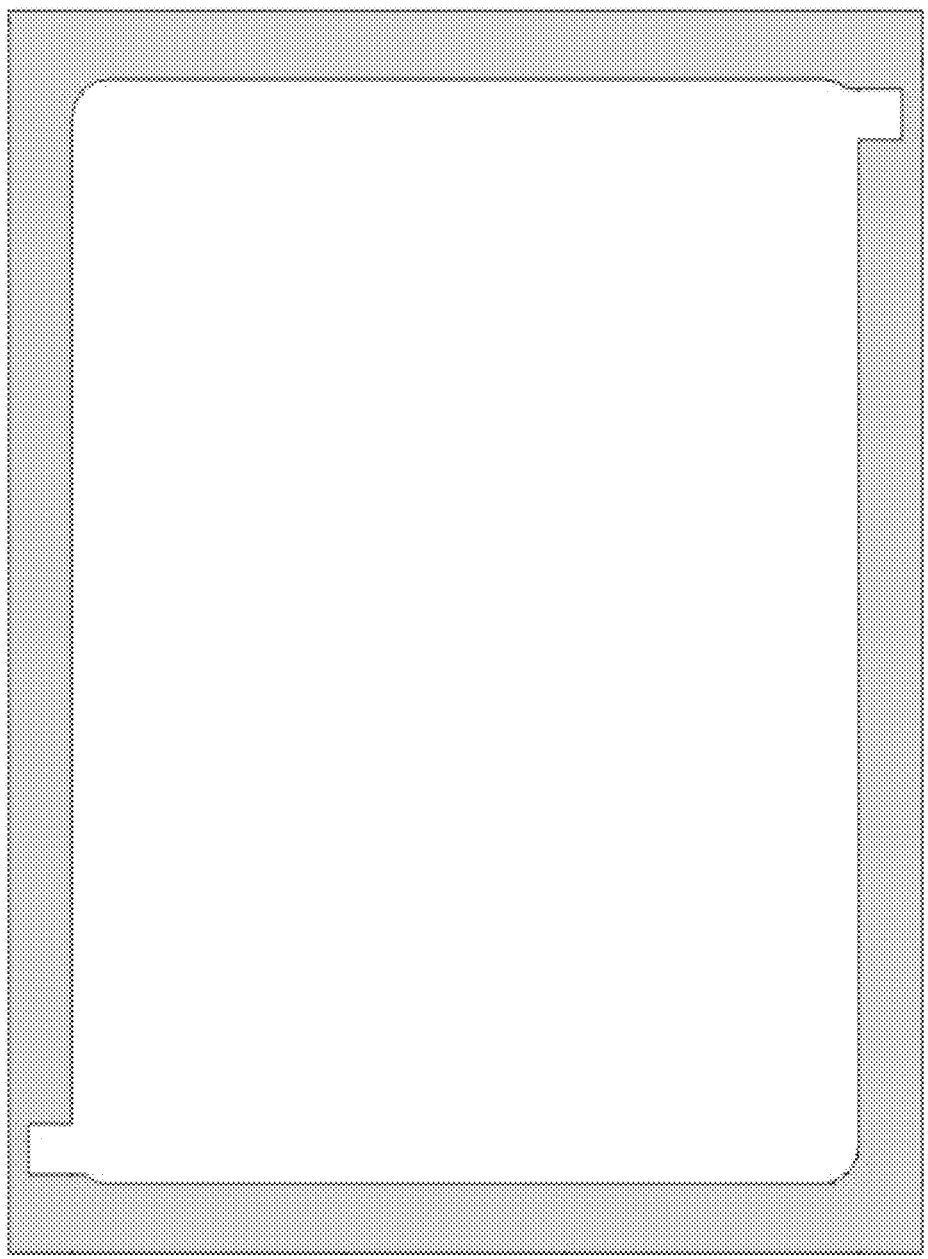
FIG. 10 illustrates yet certain features of some further embodiments of the present invention.
Figure 11:
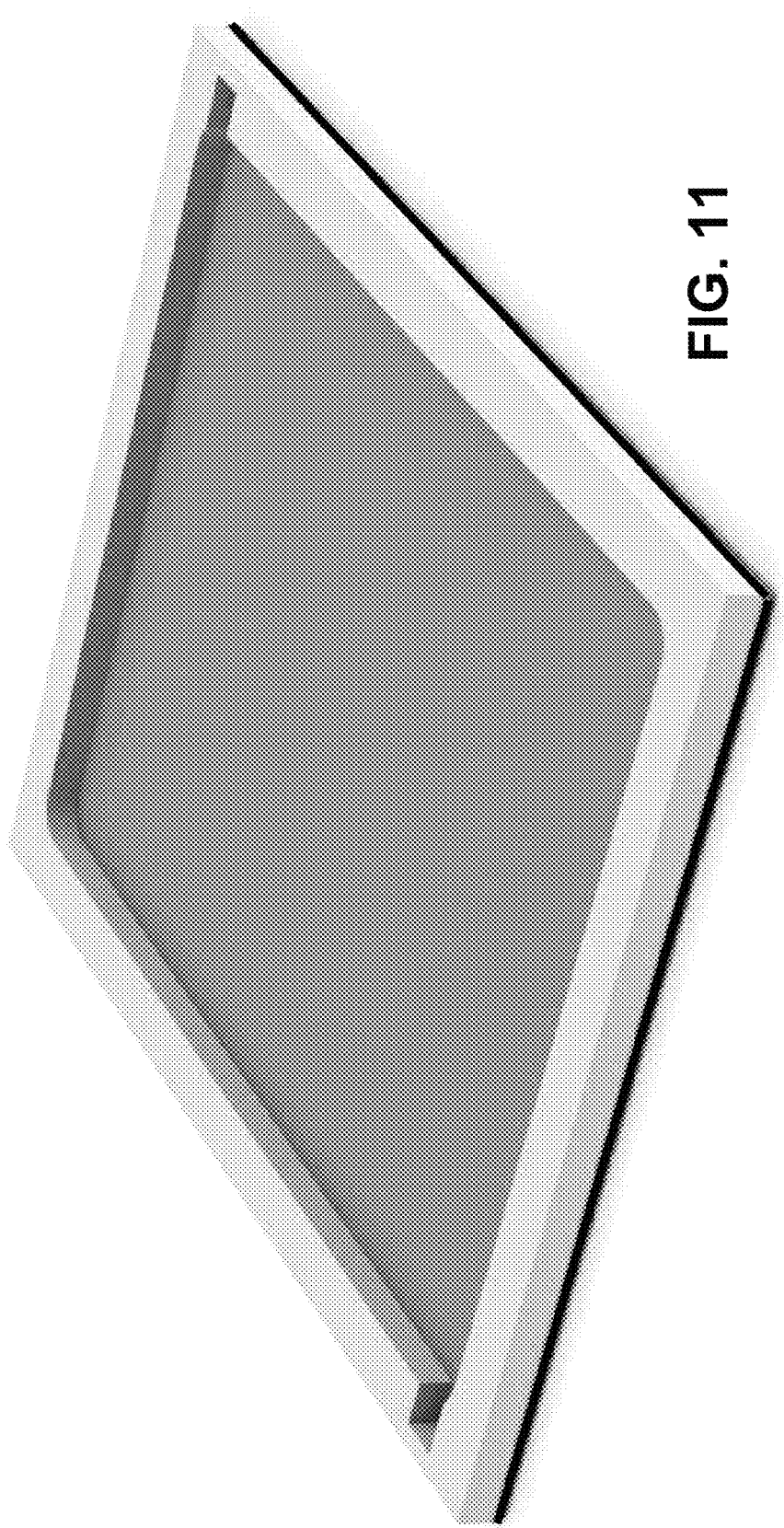
FIG. 11 illustrates yet certain features of some further embodiments of the present invention.

FIG. 6 shows an exemplary tray (607) and an exemplary matching protective film (600) that are designed in accordance with some embodiments of the instant invention. The tray (607) has three cutouts in the body of the tray. The first cutout (608) is a cutout into which: (1) a matching protective film (600) is placed and (2) a matching portion of an electronic device that is to be protected by the matching protective film is then also placed. The second cutout (609) and the third cutout (610) are cutouts in which matching alignment portions (603 and 604) of corresponding alignment tabs (601 and 602) attached to the matching protective film (600) would reside. There is also a backing tab (605) attached to a backing material located on a first surface of the protective film (600) which is opposite to a second surface to which the alignment tabs (601 and 602) are attached to.

FIGS. 7-11 show various views of additional exemplary trays designed in accordance with some embodiments of the instant invention.

Figure 12:
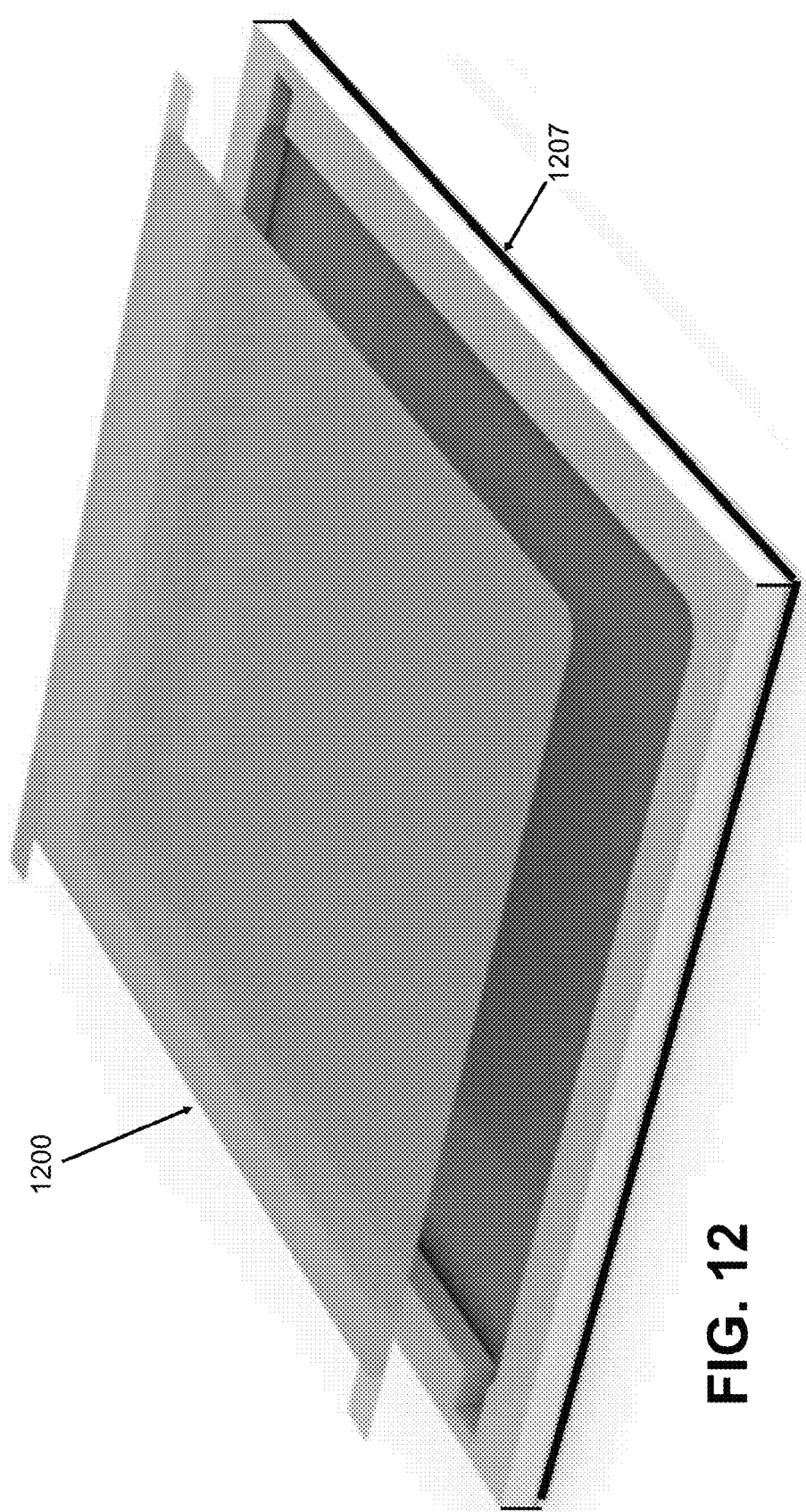
FIG. 12 illustrates yet certain features of some further embodiments of the present invention.

FIG. 12 shows another exemplary tray (1207) and another exemplary matching protective film (1200) that are designed in accordance with some embodiments of the instant invention.

In some embodiments, the instant invention provides for a kit that includes at least the following components: a tray, where the tray has: i) a first cutout, where the first cutout extends from a top surface of the tray into a body of the tray, and where a first cavity of the first cutout has a first shape that matches a portion of an electronic device hereby enabling the portion of the electronic device to be capable of being at least partially placed within the first cavity such that a first surface of the portion of the electronic device faces a first bottom surface of the first cavity; ii) at least one second cutout, where the at least one second cutout extends from a first sidewall of the first cavity of the first cutout into the body of the tray and where the at least one second cutout has a second cavity that has a second shape; and iii) at lest one third cutout, where the at least one third cutout extends from a second sidewall of the first cavity of the first cutout into the body of the tray, and where the at least one third cutout has a third cavity that has a third shape; and a protective film for the electronic device, where the protective film has a fourth shape that is equal to a fifth shape of the first surface of the portion of the electronic device, where at least one first alignment tab and at least one second alignment tab are attached to a first film surface of the protective film, where the at least one first alignment tab comprises a first alignment portion that extends from an edge of the protective film, where the at least one second alignment tab comprises a second alignment portion that extends from the edge of the protective film, where the protective film has a second film surface that is capable of adhering to the first surface of the portion of the electronic device, where the first alignment portion of the at least one first alignment tab matches the second shape of the second cavity of the at least one second cutout and where the second alignment portion of the at least one second alignment tab matches the third shape of the at least one third cutout so that: the at least one first alignment tab and the at least one second alignment tab are capable of aligning the protective film within the first cavity of the first cutout when the protective film is placed within the first cavity of the first cutout, hereby resulting in the second film surface being aligned with the first surface of the portion of the electronic device that faces the second film surface.

In some embodiments, where the second film surface has a backing material, and where at least one backing tab is attached to the backing material, and where the at least one backing tab is utilized to remove the backing material, hereby resulting in the second film surface that is capable of adhering to the first surface of the portion of the electronic device.

In some embodiments, the at least one first alignment tab and the at least one second alignment tab are capable of disengaging from the protective film hereby resulting in the electronic device that the first surface of the portion of the electronic device to be protected with the protective film when the portion of the electronic device is removed from the first cavity of the first cutout.

In some embodiments, the first alignment portion of the at least one first alignment tab comprises a first adhesive portion, where the first adhesive portion of is capable of: i) adhering the first alignment portion of the at least one first alignment tab to a second bottom surface of the at least one second cutout and ii) disengaging the first alignment portion of the at least one first alignment tab from the second bottom surface of the at least one second cutout, where the second alignment portion of the at least one second alignment tab comprises a second adhesive portion, and where the second adhesive portion of is capable of i) adhering the second alignment portion of the at least one second alignment tab to a third bottom surface of the at least one third cutout, and ii) disengaging the second alignment portion of the at least one second alignment tab from the third bottom surface of the at least one third cutout.

In some embodiments, the first surface of the portion of the electronic device has at least one screen of the electronic device.

In some embodiments, the first sidewall of the first cavity and the second sidewall of the first cavity are the same sidewall.

In some embodiments, the first sidewall of the first cavity and the second sidewall of the first cavity are different.

In some embodiments, the first sidewall of the first cavity and the second sidewall of the first cavity are substantially opposite with respect to each other.

In some embodiments, the second surface of the portion of the electronic device has at least one screen of the electronic device.

In some embodiments, the tray is made out of at least one material selected from the group consisting of: paper-based, plastic-based, metal-based, and rubber-based material.

In some embodiments, the instant invention provides for a method of installing a protective film for an electronic device where the method can include at least the following steps: providing a tray, where the tray has: i) a first cutout, where the first cutout extends from a top surface of the tray into a body of the tray, and where a first cavity of the first cutout has a first shape that matches a portion of an electronic device hereby enabling the portion of the electronic device to be capable of being at least partially placed within the first cavity such that a first surface of the portion of the electronic device faces a first bottom surface of the first cavity; ii) at least one second cutout, where the at least one second cutout extends from a first sidewall of the first cavity of the first cutout into the body of the tray and where the at least one second cutout has a second cavity that has a second shape; and iii) at lest one third cutout, where the at least one third cutout extends from a second sidewall of the first cavity of the first cutout into the body of the tray, and where the at least one third cutout has a third cavity that has a third shape; and providing the protective film for the electronic device, where the protective film has a fourth shape that is equal to a fifth shape of the first surface of the portion of the electronic device, where at least one first alignment tab and at least one second alignment tab are attached to a first film surface of the protective film, where the at least one first alignment tab comprises a first alignment portion that extends from an edge of the protective film, where the at least one second alignment tab comprises a second alignment portion that extends from the edge of the protective film, where the protective film has a second film surface that is capable of adhering to the first surface of the portion of the electronic device, where the first alignment portion of the at least one first alignment tab matches the second shape of the second cavity of the at least one second cutout and where the second alignment portion of the at least one second alignment tab matches the third shape of the at least one third cutout so that: the at least one first alignment tab and the at least one second alignment tab are capable of aligning the protective film within the first cavity of the first cutout when the protective film is placed within the first cavity of the first cutout, hereby resulting in the second film surface being aligned with the first surface of the portion of the electronic device that faces the second film surface.

Figure 13:
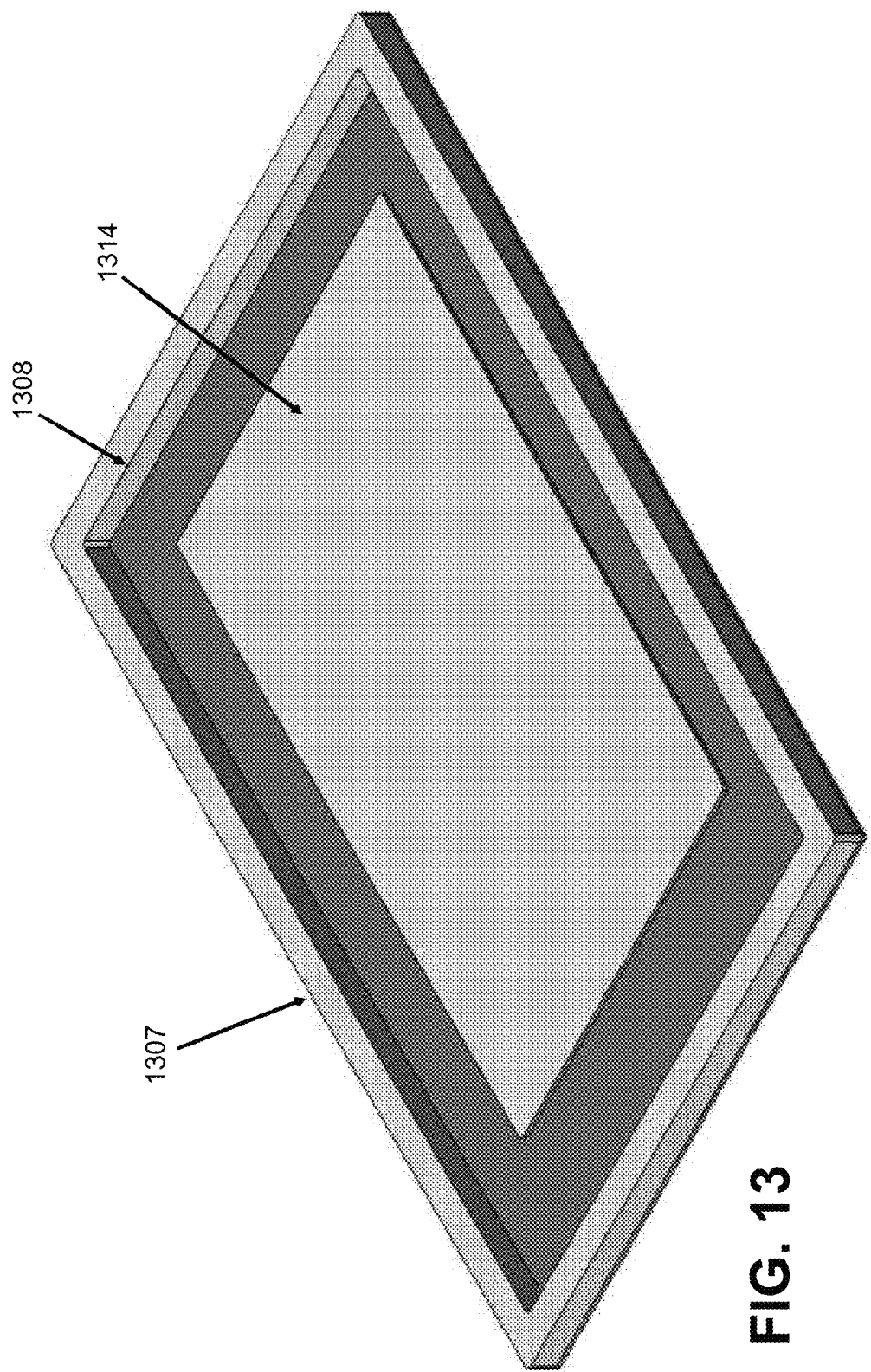
FIG. 13 illustrates yet certain features of some further embodiments of the present invention.
Figure 14:
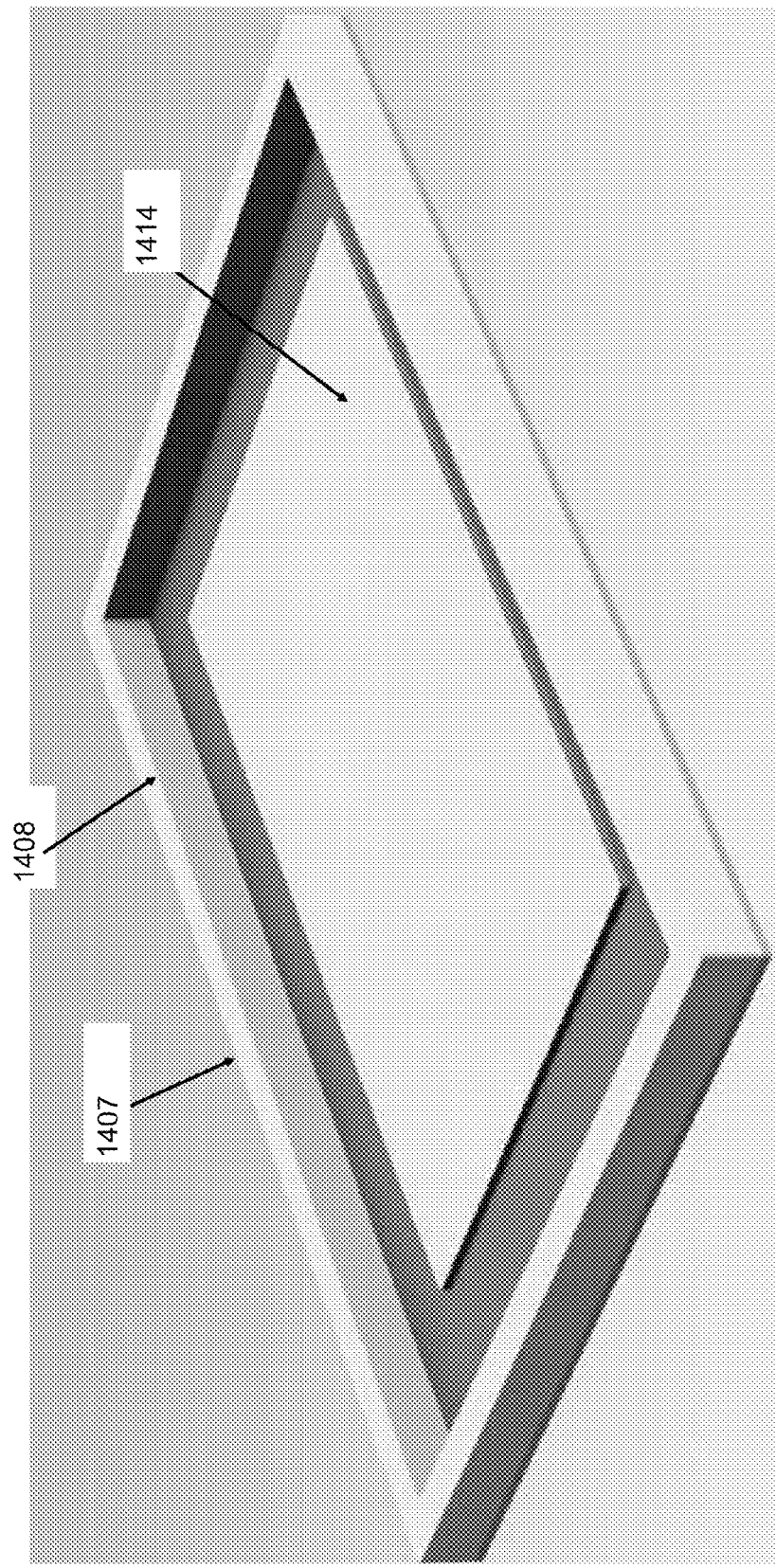
FIG. 14 illustrates yet certain features of some further embodiments of the present invention.

FIGS. 13 and 14 show another exemplary trays (1307, 1407) designed in accordance with some embodiments of the instant invention. The trays (1307, 1407) have exemplary platforms (1314, 1414) positioned within cavities of exemplary first cutouts (1308, 1408). The platforms (1314, 1414) have a first shape that matches a second shape of an area of an electronic device that needs to be protected by a matching protective film.

Figure 15A:
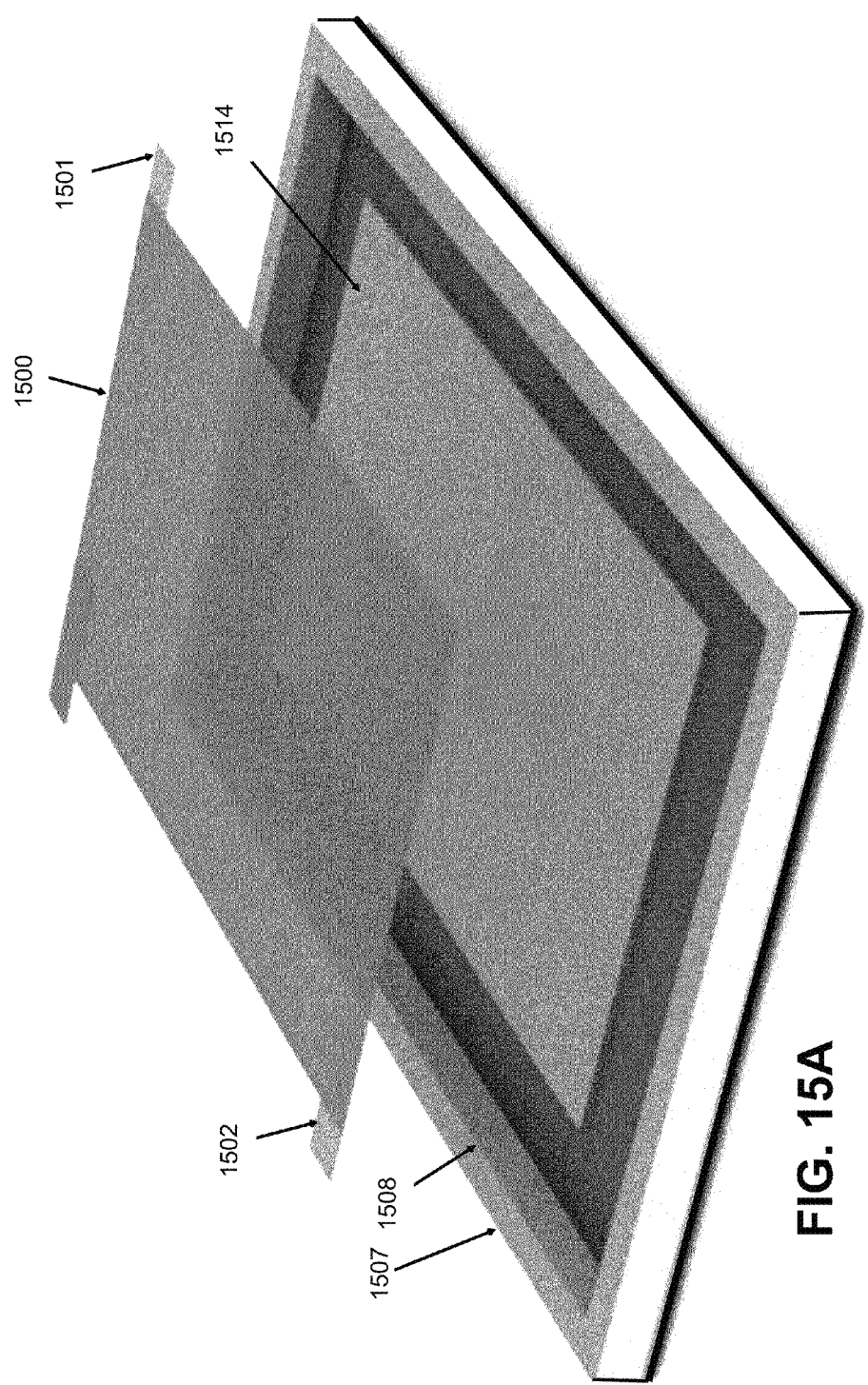
FIGS. 15A-15C illustrate certain features of some further embodiments of the present invention
Figure 15B:
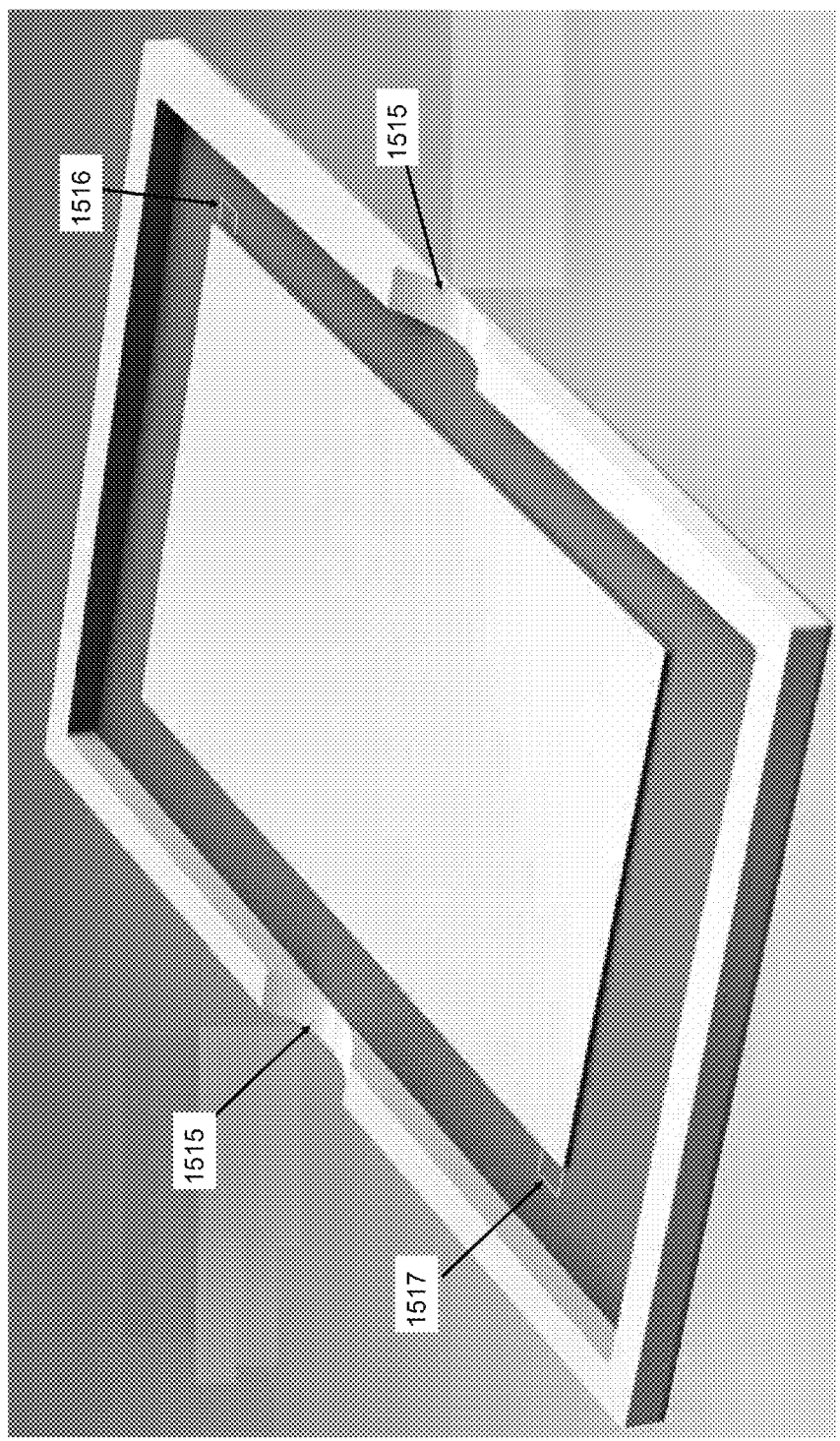
Figure 15C:
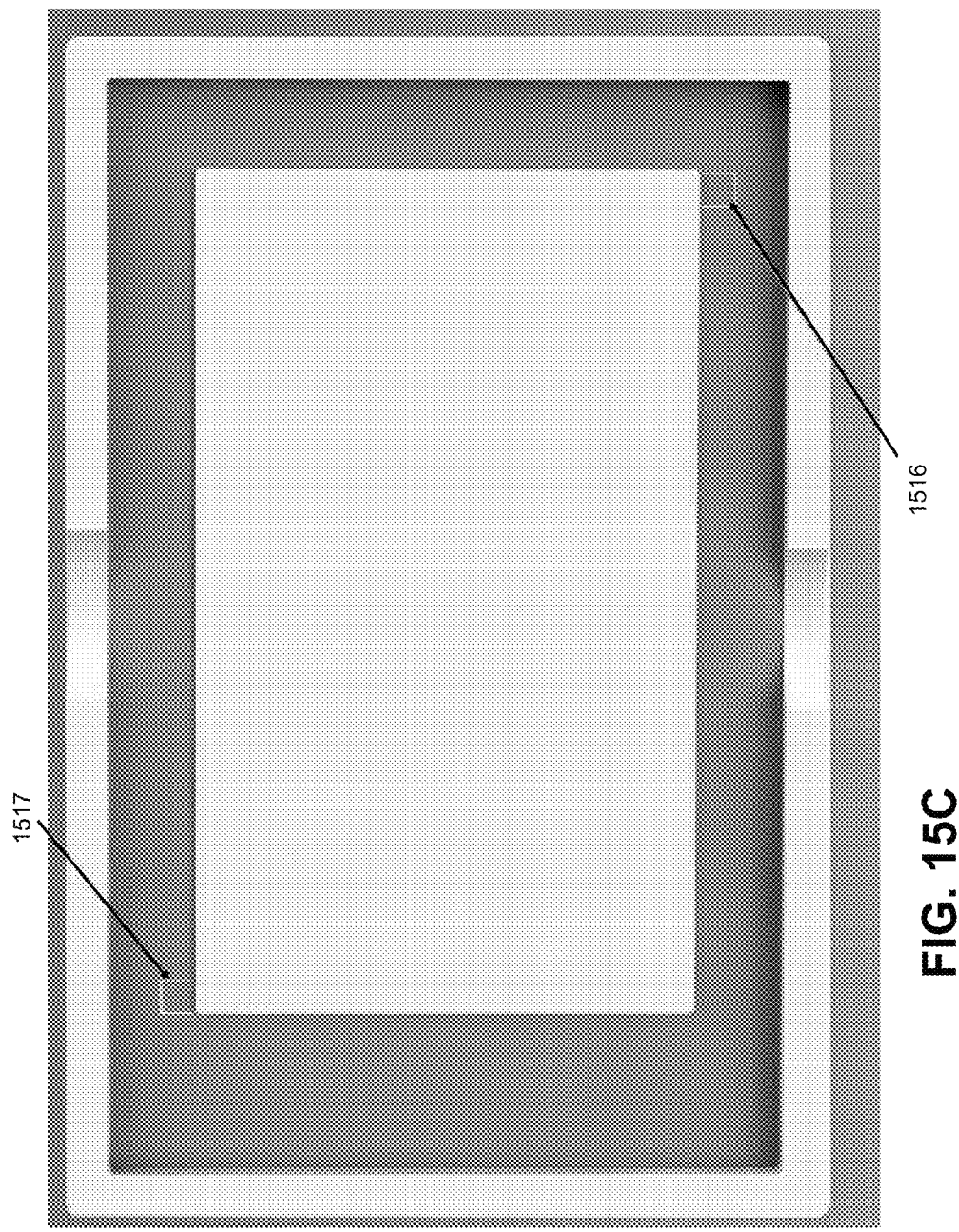

FIGS. 15 and 16A-16B show an exemplary tray (1507) and an exemplary matching protective film (1500) that are designed in accordance with some embodiments of the instant invention. The tray (1507) has an exemplary platform (1514) positioned within a cavity of an exemplary first cutout (1508). The platforms (1514) has a first shape that matches a second shape of a matching protective film (1500) that would protect a matching area of a particular electronic device (e.g., the depressed indentation of the screen on the device.) There are alignment tabs (1501 and 1502) having corresponding alignment portions (1503 and 1504). The alignment tabs (1501 and 1502) are attached to the same side of the matching protective film (1500), and a backing tab (1505) is attached to a backing material located on the opposite side of the protective film (1500). During the installation, in some embodiments of the instant invention, the protective film (1500) is placed on the platform (1514), and the alignment portions (1503 and 1504) are respectively aligned with matching alignment mechanisms (1516 and 1517) located on the bottom surface of the exemplary tray (1507). In some embodiments of the instant invention, the alignment portions (1503 and 1504) are further attached (adhere or secure) to the respective alignment mechanisms (1516 and 1517). In some embodiments of the instant invention, the alignment mechanisms (1516 and 1517) are structures that sufficiently raise from the bottom surface of the exemplary tray (1507) to allow the alignment portions (1503 and 1504) to align the protective film (1500). In some embodiments, once the backing is removed, the screen of the device fits down over the now slightly raised film and the tray's (1507) walls serving as an outside guide alignment. In some embodiments, the tray's (1507) walls further have finger cutouts (1515) to facilitate lowering and removing the electronic device from the tray (1507).

FIG. 16 shows another exemplary packaging in accordance with some embodiments of the instant invention as, for example, described above referencing FGS. 15A-15C. In some embodiments, the exemplary packaging features a slightly raised platform as the central feature which will correspond to the depressed indentation of the screen on the device. Further, the packaging is scored such that the packaging is capable of being able to be folded into a box that squares with the outside edge of a particular electronic device to secure alignment of the device over the platform. In some embodiments, the protective film is then placed on the platform and aligned properly with the alignment tabs which can adhere (secure) to the bottom surface of the packaging. In some embodiments, once the backing is removed, the screen of the device fits down over the now slightly raised film—the packaging's box serving as the outside guide alignment.

While a number of embodiments of the present invention have been described, it is understood that these embodiments are illustrative only, and not restrictive, and that many modifications may become apparent to those of ordinary skill in the art. Further, any steps of any methods described herein may be carried out in any desired order (and any steps may be added and/or deleted).

What is claimed is:
1. A kit, comprising:
   a tray, wherein the tray has a first cutout,
      wherein the first cutout extends from a top surface of the tray into a body of the tray, and
      wherein a first cavity of the first cutout has a first shape that matches a portion of a portable electronic device hereby enabling the portion of the portable electronic device to be capable of being at least partially placed within the first cavity such that a first surface of the portion of the portable electronic device faces a first bottom surface of the first cavity;
   a protective film for the portable electronic device,
      wherein the protective film has a second shape that is equal to a third shape of the first surface of the portion of the portable electronic device;
   at least one alignment tab,
   wherein a first side of the at least one alignment tab comprises at least one first adhesive material and attaches to the tray by utilizing the at least one first adhesive material, and
   wherein a second side of the at least one alignment tab comprises at least one second adhesive material and attaches to a first film surface of the protective film by utilizing the at least one second adhesive material; and
   an alignment mechanism that:
   i) comprises the tray and the at least one alignment tab;
   ii) is configured to align the protective film within the first cavity of the first cutout of the tray when the protective film is placed within the first cavity of the first cutout of the tray, hereby resulting in the protective film being secured within the tray and a second film surface of the protective film being aligned with the first surface of the portion of the portable electronic device when the portion of the portable electronic device is lowered into the first cavity of the first cutout of the tray to install the protective film onto the first surface of the portion of the portable electronic device; and
   iii) is configured to release, from the tray, the protective film installed onto the first surface of the portion of the portable electronic device, by the at least one alignment tab disengaging from the protective film without compromising adherence of the protective film to the portion of the portable electronic device.

2. The kit of claim 1, wherein a second film surface of the protective film has a backing material, wherein at least one backing tab is attached to the backing material, and wherein the at least one backing tab is utilized to remove the backing material, hereby resulting in the second film surface that is capable of adhering to the first surface of the portion of the portable electronic device.

3. The kit of claim 2, wherein the second film surface of the protective film is configured to being aligned with the first surface of the portion of the portable electronic.

4. The kit of claim 1, wherein the tray is made out of at least one material selected from the group consisting of: paper-based, plastic-based, metal-based, and rubber-based material.

5. A method of installing a protective film for a portable electronic device, comprising:
utilizing a tray,
wherein the tray has a first cutout,
wherein the first cutout extends from a top surface of the tray into a body of the tray, and
wherein a first cavity of the first cutout has a first shape that matches a portion of a portable electronic device hereby enabling the portion of the portable electronic device to be capable of being at least partially placed within the first cavity such that a first surface of the portion of the portable electronic device faces a first bottom surface of the first cavity;
utilizing the protective film for the portable electronic device,
wherein the protective film has a second shape that is equal to a third shape of the first surface of the portion of the portable electronic device;
at least one alignment tab,
wherein a first side of the at least one alignment tab comprises at least one first adhesive material and attaches to the tray by utilizing the at least one first adhesive material, and
wherein a second side of the at least one alignment tab comprises at least one second adhesive material and attaches to a first film surface of the protective film by utilizing the at least one second adhesive material; and
an alignment mechanism that:
i) comprises the tray and the at least one alignment tab;
ii) is configured to align the protective film within the first cavity of the first cutout of the tray when the protective film is placed within the first cavity of the first cutout of the tray, hereby resulting in the protective film being secured within the tray and a second film surface of the protective film being aligned with the first surface of the portion of the portable electronic device when the portion of the portable electronic device is lowered into the first cavity of the first cutout of the tray to install the protective film onto the first surface of the portion of the portable electronic device; and
iii) is configured to release, from the tray, the protective film installed onto the first surface of the portion of the portable electronic device, by the at least one alignment tab disengaging from the protective film without compromising adherence of the protective film to the portion of the portable electronic device.

6. The method of claim 5, wherein a second film surface of the protective film has a backing material, wherein at least one backing tab is attached to the backing material, and wherein the at least one backing tab is utilized to remove the backing material, hereby resulting in the second film surface that is capable of adhering to the first surface of the portion of the portable electronic device.

7. The method of claim 6, wherein the second film surface of the protective film is configured to being aligned with the first surface of the portion of the portable electronic device has at least one screen of the electronic device.

8. The method of claim 5, wherein the tray is made out of at least one material selected from the group consisting of: paper-based, plastic-based, metal-based, and rubber-based material.

* * * * *